US012723726B2

(12) United States Patent
Gromfeld

(10) Patent No.: US 12,723,726 B2
(45) Date of Patent: Sep. 1, 2026

(54) LIGHT MODULE FOR A LIGHTING DEVICE OF A MOTOR VEHICLE

(71) Applicant: VALEO VISION, Bobigny (FR)

(72) Inventor: Yves Gromfeld, Bobigny (FR)

(73) Assignee: Valeo Vision, Bobigny (FR)

( * ) Notice: Subject to any disclaimer, the term of this patent is extended or adjusted under 35 U.S.C. 154(b) by 180 days.

(21) Appl. No.: 18/579,898

(22) PCT Filed: Jul. 19, 2022

(86) PCT No.: PCT/EP2022/070263
§ 371 (c)(1),
(2) Date: Jan. 17, 2024

(87) PCT Pub. No.: WO2023/001851
PCT Pub. Date: Jan. 26, 2023

(65) Prior Publication Data

US 2024/0360973 A1 Oct. 31, 2024

(30) Foreign Application Priority Data

Jul. 20, 2021 (FR) ....................................... 2107793

(51) Int. Cl.
*F21S 41/67* (2018.01)
*F21S 41/148* (2018.01)
(Continued)

(52) U.S. Cl.
CPC ............. *F21S 41/67* (2018.01); *F21S 41/148* (2018.01); *F21S 41/26* (2018.01); *F21S 41/336* (2018.01);
(Continued)

(58) Field of Classification Search
CPC .. F21S 41/43; F21S 41/47; F21S 41/60; F21S 41/62; F21S 41/65; F21S 41/663;
(Continued)

(56) References Cited

U.S. PATENT DOCUMENTS 8,545,073 B2 10/2013 Meyrenaud
2018/0356064 A1* 12/2018 Yamamoto .............. F21S 41/43
(Continued)

FOREIGN PATENT DOCUMENTS

EP 2690351 A2 1/2014
FR 3102535 A1 4/2021
(Continued)

OTHER PUBLICATIONS

Machine translation of WO 2020025171 A1 retrieved from the FIT database of PE2E search. (Year: 2025).*
(Continued)

*Primary Examiner* — Colin J Cattanach
(74) *Attorney, Agent, or Firm* — Valeo Vision

(57) ABSTRACT

The invention relates to a light module for a lighting device of a motor vehicle, including a light source and an optical device, the optical device being arranged to receive light emitted by the light source and to form, from the light, a light beam having an upper cut-off including a first portion and a second portion which are substantially horizontal and separated by a third portion descending from the first portion and ascending towards the second portion, the third portion being such that the light beam has, when projected onto a screen, a light-free zone extending at least horizontally in a range from substantially 0° to −2.2° and vertically in a range from substantially 0° to −0.8°.

16 Claims, 3 Drawing Sheets

(51) Int. Cl.

| | |
|---|---|
| ***F21S 41/26*** | (2018.01) |
| ***F21S 41/33*** | (2018.01) |
| ***F21S 41/36*** | (2018.01) |
| ***F21S 41/60*** | (2018.01) |
| ***F21S 41/62*** | (2018.01) |
| ***F21S 41/65*** | (2018.01) |
| ***F21S 41/663*** | (2018.01) |
| ***F21W 102/00*** | (2018.01) |
| ***F21W 102/10*** | (2018.01) |
| ***F21W 102/13*** | (2018.01) |
| ***F21W 102/135*** | (2018.01) |
| ***F21W 102/155*** | (2018.01) |
| ***F21W 102/16*** | (2018.01) |
| ***F21W 102/165*** | (2018.01) |
| ***F21W 102/17*** | (2018.01) |
| ***F21W 102/19*** | (2018.01) |
| ***F21W 102/20*** | (2018.01) |
| ***F21W 102/30*** | (2018.01) |

(52) U.S. Cl.

CPC ............. *F21S 41/337* (2018.01); *F21S 41/36* (2018.01); *F21S 41/65* (2018.01); *F21S 41/60* (2018.01); *F21S 41/62* (2018.01); *F21S 41/663* (2018.01); *F21W 2102/00* (2018.01); *F21W 2102/10* (2018.01); *F21W 2102/13* (2018.01); *F21W 2102/135* (2018.01); *F21W 2102/155* (2018.01); *F21W 2102/16* (2018.01); *F21W 2102/165* (2018.01); *F21W 2102/17* (2018.01); *F21W 2102/19* (2018.01); *F21W 2102/20* (2018.01); *F21W 2102/30* (2018.01)

(58) Field of Classification Search

CPC ......... F21W 2102/13; F21W 2102/135; F21W 2102/14; F21W 2102/155; F21W 2102/00; F21W 2102/10; F21W 2102/16; F21W 2102/165; F21W 2102/17; F21W 2102/19; F21W 2102/20; F21W 2102/30

See application file for complete search history.

(56) References Cited

U.S. PATENT DOCUMENTS

| | | | | |
|---|---|---|---|---|
| 2021/0404621 | A1* | 12/2021 | Han ........................ | F21S 41/68 |
| 2023/0034372 | A1 | 2/2023 | Gromfeld et al. | |

FOREIGN PATENT DOCUMENTS

| | | | | |
|---|---|---|---|---|
| FR | 2171272 | A1 | 10/2022 | |
| FR | 2944578 | A1 | 10/2022 | |
| GB | 1391731 | A | 4/1975 | |
| WO | WO-2020025171 | A1 * | 2/2020 | ............ F21S 41/321 |
| WO | 2020126611 | A1 | 6/2020 | |

OTHER PUBLICATIONS

European Patent Office, International Search Report (with English translation) and Written Opinion of corresponding International Application No. PCT/EP2022/070263, dated Sep. 5, 2022.

* cited by examiner

LIGHT MODULE FOR A LIGHTING DEVICE OF A MOTOR VEHICLE

TECHNICAL FIELD

The invention relates to the field of motor vehicle lighting. More precisely, the invention relates to a light-emitting module and a lighting device for a motor vehicle.

BACKGROUND OF THE INVENTION

Most states, countries or regions enact regulations with which a motor vehicle must comply in order to be allowed on the road. There are thus regulations requiring the illumination emitted by a front headlamp of a motor vehicle to meet certain constraints under certain conditions. This is in particular the case for low-beam illumination which, in most regulations, is required to be produced by a light beam having an upper cutoff, which demarcates an illuminated zone from a zone not illuminated by this illumination, and having, at certain points, a luminous flux greater than a given value, and at other points, a luminous flux less than a given value.

In the United States, the Insurance Institute for Highway Safety (IIHS) has its own set of tests and ratings allowing the performance of a motor-vehicle headlamp to be evaluated. The IIHS test protocol in particular aims to evaluate the capacity of a light beam emitted by such a headlamp to cause discomfort glare to a road user while the vehicle is being driven. To carry out a test, the vehicle is driven along certain straight or bendy routes on which glare-measuring photoelectric cells have been placed in appropriate locations. The light intensities captured by these cells are continuously recorded, and a rating is assigned to the vehicle depending on these recorded intensities. In order to facilitate design of a headlamp for a motor vehicle, prior to such a test, it is possible to replicate the test protocol by projecting the light beam emitted by this headlamp onto a screen marked with an orthonormal coordinate system and with a photometric grid made up of points placed on this screen and defining maximum and minimum luminous-flux thresholds, certain of these points being positioned above the horizontal axis of the coordinate system so as to correspond to glare-measuring photoelectric cells. Varying the vertical or horizontal orientation of the light beam then makes it possible to reproduce configurations reflecting a change in slope, a change in setup or cornering of a motor vehicle equipped with such a headlamp. It possible to predict the performance score that will be assigned to the vehicle based on the value of the luminous flux of the beam at the points defining the maximum and minimum thresholds and on whether or not the beam exceeds discomfort-glare values set for each of the points corresponding to the photoelectric cells.

Conventionally, the upper cutoff of a light beam intended to produce low-beam illumination for right-hand traffic in the US is a cutoff which is horizontal on the whole and in which a "well" is provided, the luminous flux being required to be less than 12 kCd inside the well so that the light beam respects a maximum threshold defined at a point positioned substantially in the center of this well. For performance reasons, this well is slightly offset to the left with respect to the origin of the coordinate system. However, three of the points corresponding to the glare-measuring photoelectric cells are positioned above the horizontal axis between the well and the origin of the coordinate system. Thus, when the lighting beam is moved vertically upward, the zone to the right of the well, in which zone the luminous flux is much greater than 12 kCd, passes above the horizontal axis to level with these cells, thus causing glare thresholds to be exceeded. The score of the headlamp for these vertical orientations is therefore greatly degraded.

SUMMARY OF THE INVENTION

The present invention thus relates to this context and aims to overcome this problem.

To these ends, one subject of the invention is a light-emitting module for a lighting device for a motor vehicle, comprising a light source and an optical device, the optical device being arranged to receive light emitted by the light source and to form, from this light, a light beam having an upper cutoff comprising a first segment and a second segment that are substantially horizontal and that are separated by a third segment that descends from the first segment and rises to the second segment, said third segment being such that the light beam has, when projected onto a screen, a zone devoid of light lying at least, horizontally, in a range extending substantially from 0° to −2.2° and, vertically, in a range ex-tending substantially from 0° to −0.8°.

It should thus be understand that, by virtue of the light-emitting module, it is possible to generate a light beam the upper cutoff of which makes it possible to meet the regulatory requirements of low-beam illumination, while the zone devoid of light makes it possible to prevent the light-emitting module from activating the glare thresholds of the photoelectric cells of the IIHS test protocol when the vertical orientation of the light beam is modified. The light beam may then be associated with another light beam that complements it in this zone devoid of light, so as to respect the maximum and minimum luminous-flux thresholds of the photometric grid of this low-beam illumination. The score of a headlamp incorporating such a module is thus improved.

In the invention, the expression "projection of a light beam onto a screen" is understood to mean projection of a light beam onto a vertical screen marked with an orthonormal coordinate system, for example placed 25 meters from the light-emitting module. In this coordinate system, the coordinates correspond to horizontal and vertical angles measured from the origin of the coordinate system. Positive abscissae correspond to the half-plane located to the right of the vertical axis, negative abscissae correspond to the half-plane located to the left of the vertical axis, positive ordinates correspond to the half-plane located above the horizontal axis and negative ordinates correspond to the half-plane located below the horizontal axis.

Advantageously, the light beam is intended to participate in production of low-beam illumination for right-hand traffic in the US.

For example, when the light beam is projected onto the screen with a vertical orientation of 0°, the first and second segments of the upper cutoff of the light beam are aligned with the horizontal axis of the coordinate system.

Again for example, when the light beam is projected onto the screen with a horizontal orientation of 0°, the first segment extends to the left of the vertical axis of the coordinate system, in particular to a point of junction with the third segment, which point is located at least 7° to the left of the vertical axis (−7°), for example at −7.3°. Preferably, the second segment extends to the right of the vertical axis of the coordinate system, for example from a point of junction with the third segment, which point is located at 0°. In this way, the third segment of the upper cutoff makes it possible to form, in the light beam, a zone devoid of light encompassing a point located horizontally at −3.5° and vertically at −0.86°, in the vicinity of which are positioned IIHS-defined maximum and minimum luminous-flux threshold points.

Advantageously, the optical device is arranged so that the third segment of the upper cut-off extends downward, from the first segment, obliquely. Where appropriate, the third segment may extend, from the point of junction with the first segment, to a point located horizontally between −3° and −4°, and in particular at −3.5°, and vertically between −1.7° and −2°.

In one embodiment of the invention, the optical device is arranged so that the third segment rises obliquely and substantially continuously to the second segment.

By way of example, when the light beam is projected onto the screen with a horizontal orientation of 0°, the optical device is arranged so that the third segment rises obliquely and substantially continuously from a point located horizontally between −3° and −4° and vertically between −1.7° and −2° to a point of junction with the second segment, said point being located at 0°, or at the origin of the coordinate system.

In another embodiment of the invention, the optical device is arranged so that the third segment rises obliquely to the second segment in such a way as to form a substantially horizontal plateau. For example, when the light beam is projected onto the screen with a horizontal orientation of 0°, this plateau may be positioned vertically at −0.8°. This profile of the third segment makes it possible to obtain a tolerance in the vertical adjustment of the orientation of the light beam.

Again for example, the substantially horizontal plateau may lie horizontally in a range extending from −2.5° to 0° and preferably in a range extending from −2.2° to −0.1°, and even more preferably from −2° to −0.2°.

By way of example, when the light beam is projected onto the screen with a horizontal orientation of 0°, the optical device is arranged so that the third segment comprises a straight-line segment that rises obliquely from a point located horizontally between −3° and −4° and vertically between −1.7° and −2° to a point of junction with the substantially horizontal plateau. For example, the junction point is located vertically at −0.8° and horizontally at −2°.

In one example of embodiment of the invention, the optical device comprises a collector comprising a reflective surface arranged to collect and reflect the light emitted by said light source and a lens arranged to project the light reflected by the collector, said light beam being formed by an image of the reflective surface of the collector formed by said lens. Where appropriate, the light source may comprise a light-emitting semiconductor chip, such as a light-emitting diode for example.

Advantageously, the collector has a rear edge and the lens has a focal zone located in the vicinity of said rear edge of the collector so that said upper cutoff of the light beam is formed by the image of the rear edge of this collector formed by said lens. For example, the rear edge may have an elliptical profile provided with a recess intended to form the third segment of said cutoff. Moreover, the first segment and the second segment are formed by the rest of the rear edge located on either side of said recess, respectively.

If so desired, said reflective surface of the collector may have a zone that is indented with respect to the rest of said reflective surface. This indented zone, which is set back vis-à-vis the focal zone of the lens, makes it possible to deflect some of the light emitted by the light source to a point located above the upper cutoff of the light beam, to the right of the vertical axis.

If so desired, the light-emitting module may comprise a member for adjusting the vertical and/or horizontal orientation of the light beam.

The invention also relates to a lighting device for a motor vehicle, comprising a light-emitting module according to the invention, said light-emitting module being a first light-emitting module and the light beam formed by the optical device of this first light-emitting module being a first light beam, characterized in that it comprises a second light-emitting module comprising a light source and an optical device, the optical device of this second light-emitting module being arranged to receive light emitted by the light source of this second light-emitting module and to form, from this light, a second light beam having an upper cutoff, the first light-emitting module and the second light-emitting module being arranged so that the upper cutoffs of the first and second light beams are substantially at least partially aligned.

In the invention, the first and second light-emitting modules may be arranged so that at least one segment of the upper cutoff of the second light beam is aligned with the first and second segments of the first light beam. Where appropriate, the first and second light beams being intended to be projected simultaneously, it is thus ensured that some of the second light beam is superposed on the zone devoid of light of the first light beam.

In one example of embodiment of the invention, the second light-emitting module comprises a plurality of light-emitting sub-modules each comprising a light source and an optical device that is arranged to receive light emitted by the light source of this sub-module and to form, from this light, a light sub-beam, the second light beam being formed by all of the light sub-beams together.

Advantageously, the lighting device may comprise a unit for controlling the light sources of the first and second light-emitting modules, which unit is able to receive an instruction to emit a given photometric function, a low beam for example, and arranged, on receipt of said instruction, to control each of the light sources of the first and second light-emitting modules so that these light sources emit light simultaneously.

Advantageously, the optical device of the second light-emitting module is arranged so that the second light beam has a zone of lower light intensity, of width larger than the width of the third segment of the upper cutoff of the first light beam and intended to be super-posed on said zone devoid of light of the first light beam. Where appropriate, said zone of lower light intensity is bordered by the upper cutoff of the second light beam and may be demarcated from the rest of the second light beam by a convex boundary. This zone of lower light intensity makes it possible to ensure that, in the zone devoid of light, the luminous flux of the beam formed by combination of the first and second light beams will be less than 12 kCd.

According to one example of embodiment of the invention, the optical device of the second light-emitting module comprises a collector comprising a reflective surface arranged to collect and reflect the light emitted by said light source of the second light-emitting module and a lens arranged to project the light reflected by the collector of the second light-emitting module, said light beam being formed by an image of the reflective surface of the collector formed by said lens. Where appropriate, the collector has a rear edge provided with a recess and the lens has a focal zone located in the vicinity of said rear edge of the collector so that said upper cutoff of the light beam is formed by the image of the rear edge of this collector formed by said lens. For example, the rear edge of the col-lector may be of a substantially elliptical profile, and the lens may be a toric lens.

Advantageously, the collectors of the first and second light-emitting modules form a single part, and the lenses of the first and second light-emitting modules form a single lens.

BRIEF DESCRIPTION OF DRAWINGS

The present invention will now be described using examples, which merely illustrate and in no way limit the scope of the invention, and the appended drawings, in which drawings the various figures show.

DETAILED DESCRIPTION OF THE INVENTION

In the following description, elements that are identical in structure or in function and that appear in various figures keep the same references, unless otherwise stated.

Figure 1:
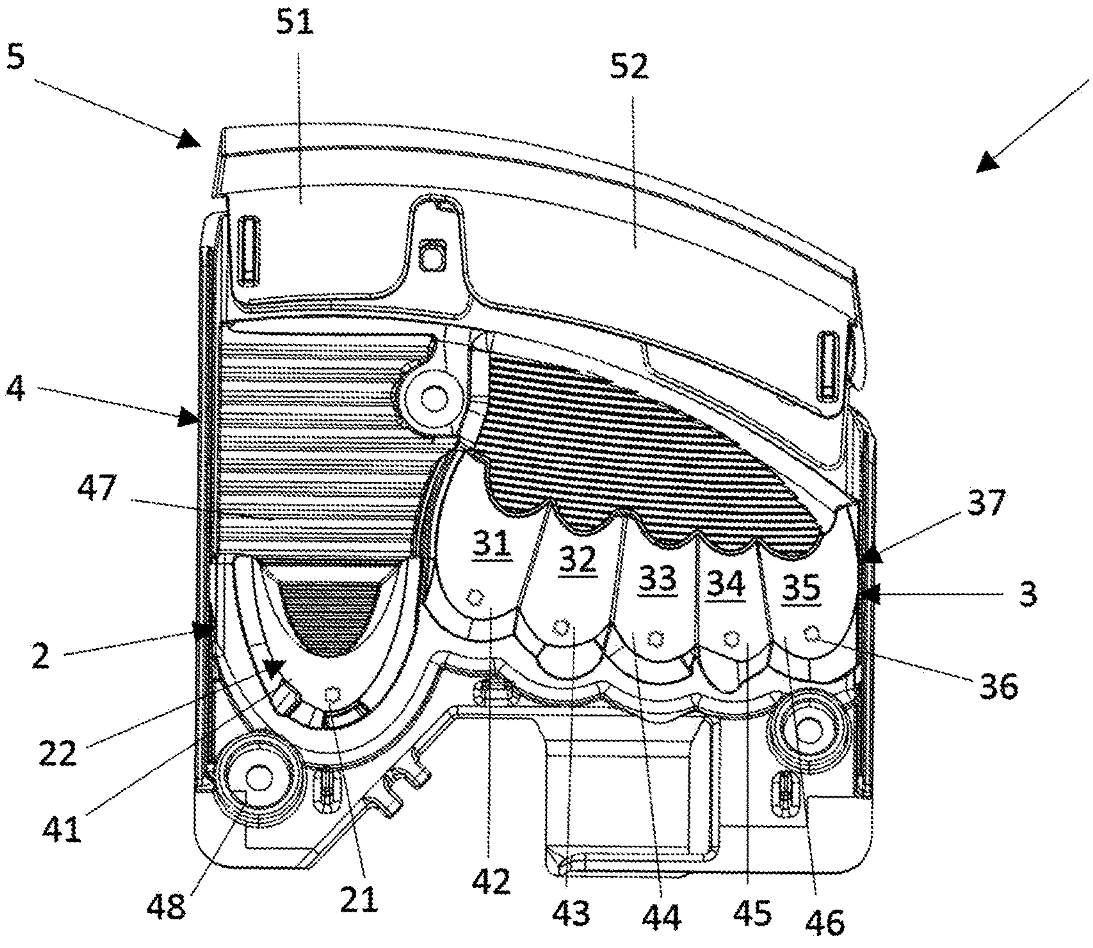
FIG. 1 schematically and partially a bottom view of a lighting device according to one embodiment of the invention.

FIG. 1 shows a bottom view of a lighting device 1 according to one embodiment of the invention.

The lighting device 1 comprises a first light-emitting module 2 and a second light-emitting module 3.

The first light-emitting module 2 comprises a light-emitting diode 21 and an optical device 22. The optical device 22 comprises a collector 41 provided with a reflective surface and a lens 51.

The second light-emitting module 3 comprises five sub-modules 31 to 35, each comprising one light-emitting diode 36 and one optical device 37. Each optical device 37 of the submodules 31 to 35 comprises a collector 42 to 46 provided with a reflective surface and the same lens 52.

In the example described, all of the collectors 41 to 46 of the light-emitting modules 2 and 3 form a single part 4 provided with metallized cavities forming the reflective surfaces of these collectors. One portion 47 of the surface of the single part 4 is provided with a graining or streaks making it possible to prevent stray reflection of the light emitted by the diodes 21 and 36 outside the collectors 41 to 46.

The single part 4 forms a cover of the lighting device 1 and is provided with fastening elements 48 allowing it to be attached to a housing of the lighting device (not shown). The light-emitting diodes 21 and 36 are thus mounted on a common carrier, in particular a common printed circuit board, that is fastened to the housing. The lighting device 1 may thus be integrated into a front headlamp of a motor vehicle, in particular by way of a member (not shown) for adjusting the horizontal and/or vertical orientation of this lighting device 1.

The lenses 51 and 52 form a single part 5, namely a toric lens 5, which is fastened between the single part 4 and the housing of the lighting device 1 to form a face for exit of light of this lighting device.

In each of the light-emitting module 2 and light-emitting sub-modules 31 to 35, the reflective surface of the collector 41 to 46 collects the light emitted by the light-emitting diode 21, 36 and reflects it toward the lens 51 or 52, which is arranged to project this light onto the road. The first light-emitting module 2 thus forms a first light beam F1 while all of the light beams emitted by the light sub-modules 31 to 35 of the second light-emitting module 3 together form a second light beam F2.

The lighting device comprises a control unit (not shown) that is able to receive an instruction to emit a given photometric function, and that is arranged, in response to this instruction, to control the light-emitting diodes 21 and 36 so that they emit light simultaneously, so that the first and second light beams F1 and F2 are projected together.

Figure 2:
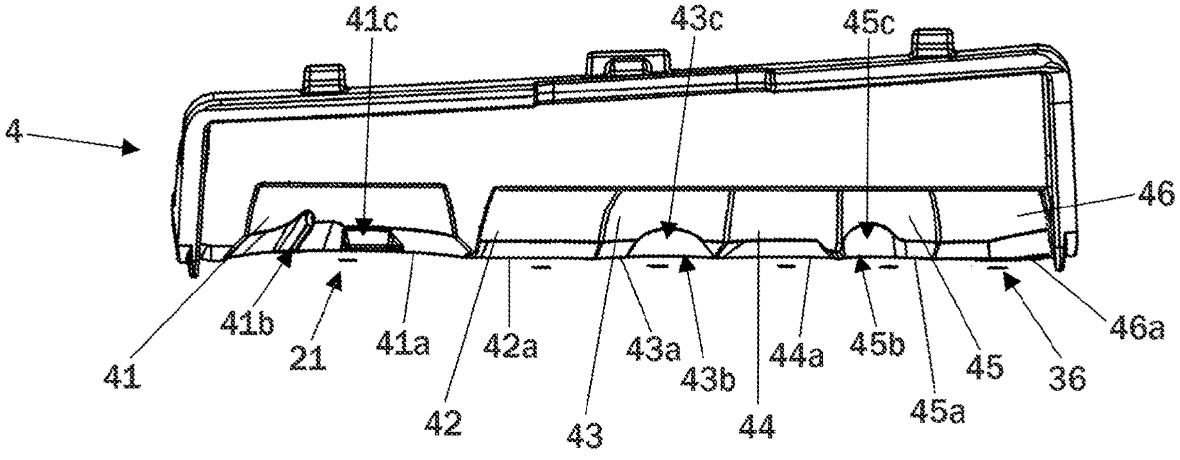
FIG. 2 schematically and partially a front view of the lighting device of FIG. 1.
Figure 3:
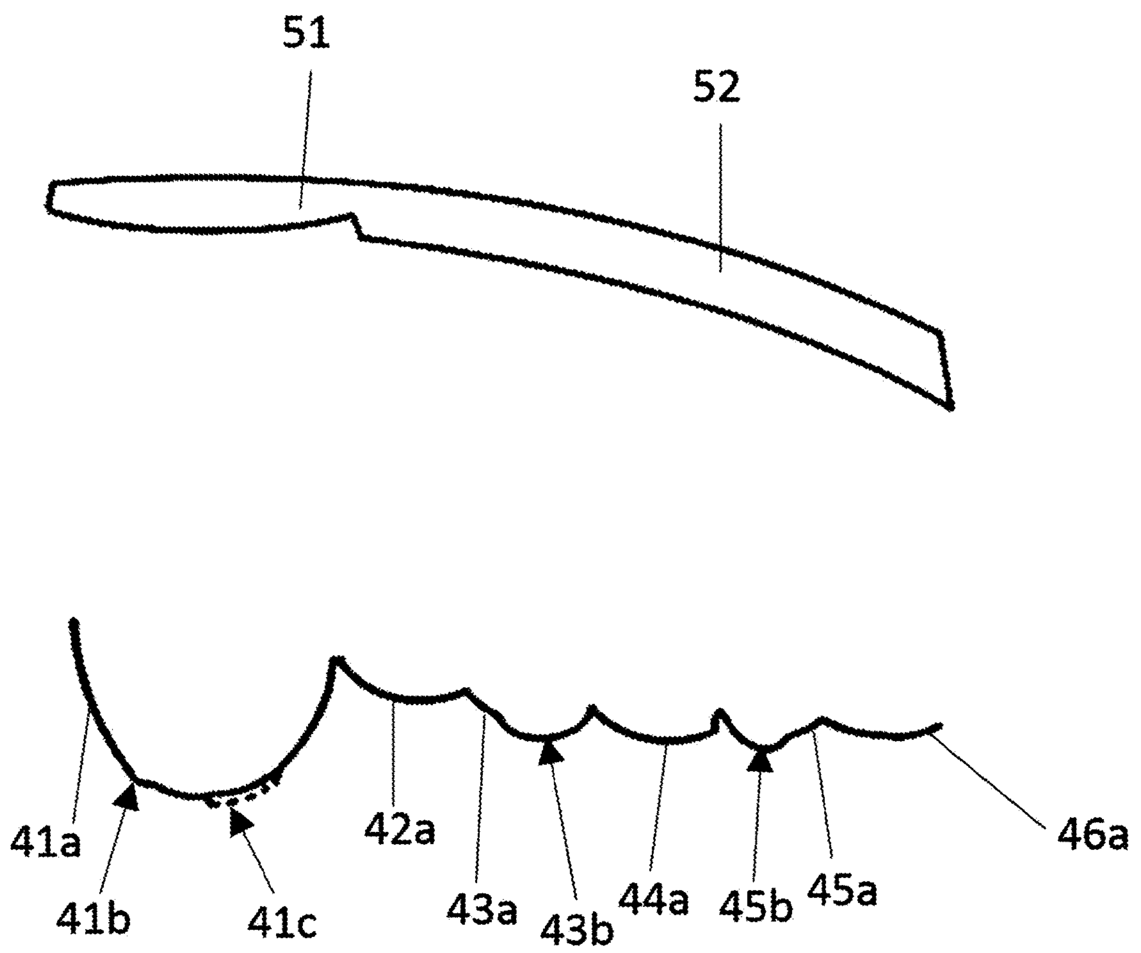
FIG. 3 schematically and partially a view in cross section through a horizontal plane of the lighting device of FIG. 1.
Figure 4:
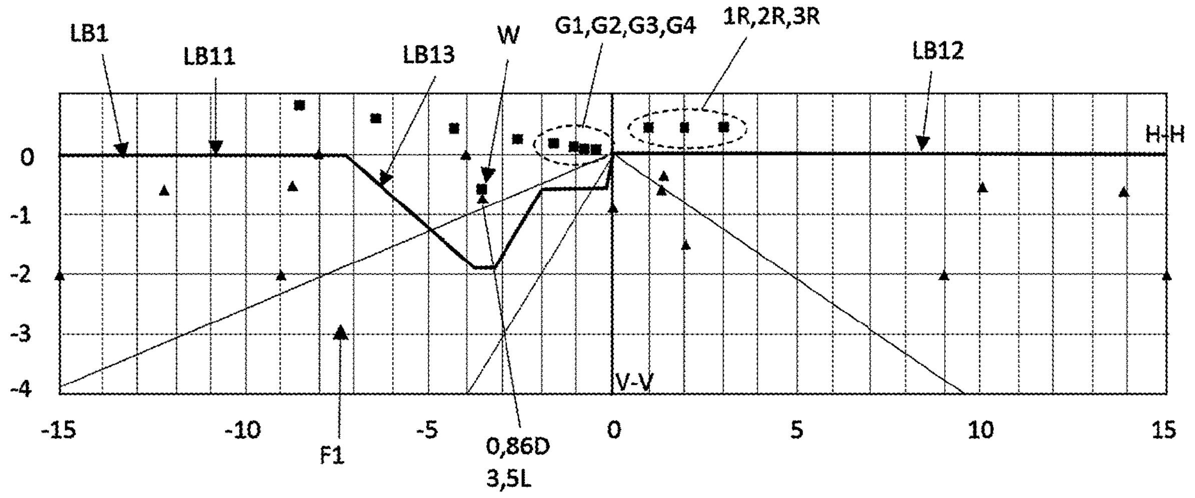
FIG. 4 schematically and partially a projection onto a screen of a first light beam emitted by the lighting device of FIG. 1.
Figure 5:
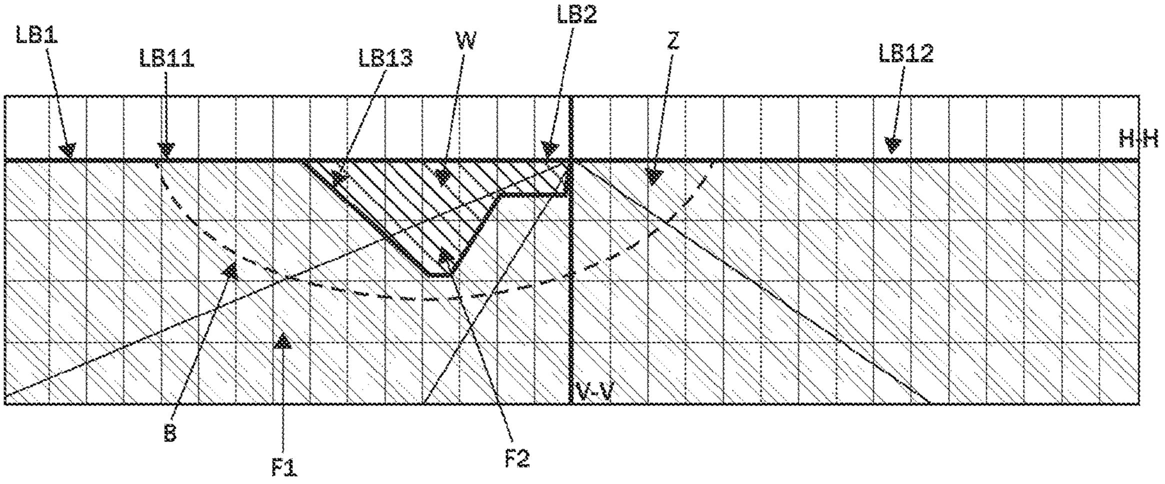
FIG. 5 schematically and partially a projection onto a screen of an overall light beam emitted by the lighting device of FIG. 1.

FIG. 2 shows a front view of the single part 4 comprising the collectors 41 to 46, while FIG. 3 shows a view of the lighting device 1 in cross section through a horizontal plane passing through the rear edges of the collectors 41 to 46. FIG. 4 shows a projection, onto a screen, of the first light beam F1 emitted by the first light-emitting module 2, when the lighting device 1 is adjusted to have an orientation of 0° and FIG. 5 shows a projection, onto the same screen, of the first and second light beams F1 and F2 emitted simultaneously by the first and second light-emitting modules 2 and 3.

Each collector 41 to 46 thus has, vertically, a truncated parabolic profile defining a cavity in which the light-emitting diode 21, 36 is arranged. Each collector 41 to 46 thus has a rear edge 41*a* to 46*a*, shown in FIG. 3. Each of the lenses 51 and 52 has a focal zone, a focal line for example, passing through this rear edge of the collector 41*a* to 46*a*, so that this lens projects the image of this collector onto the road and so that the light beam resulting from this projection has an upper cutoff, demarcating an illuminated zone from an unilluminated zone, formed by this rear edge.

In the case of the first light-emitting module 2, the rear edge 41*a* has a substantially elliptical profile in which a recess 41*b* is formed, which recess protrudes rearwardly from the rest of the rear edge.

As shown in FIG. 4, the first light beam F1 formed by this first light-emitting module 2 has an upper cutoff LB1 defined by this rear edge 41*a*. In FIG. 4, the first light beam F1 is projected onto a screen placed 25 meters from the lighting device 1, the screen being marked with an orthonormal coordinate system that has a horizontal axis H-H and a vertical axis V-V that intersect at an origin. The graduations indicate horizontal and vertical angles of emission from the lighting device 1. The values indicated below will be obtained if the lighting device is adjusted to have a vertical orientation of 0°.

The upper cutoff LB1 comprises a substantially horizontal first segment LB11 aligned with the horizontal axis H-H, a substantially horizontal second segment LB12 also aligned with the horizontal axis H-H and a third segment LB13 separating the first segment LB11 from the second segment LB12. The third segment LB13 is formed by the recess 41*b* while the first segment LB11 and the second segment LB12 are formed by the rest of the rear edge 41*a* located on either side of this recess 41*b*, respectively.

Due to the fact that the recess 41*b* is oriented rearwardly, the third segment LB13 descends from the first segment LB11 before then rising to the second segment LB12, and thus defines a zone W devoid of light lying below these first and second segments LB11 and LB12.

The recess 41*b* is placed on the rear edge 41*a* so that the first segment LB11 and the third segment LB13 join at a junction point located horizontally at −7.3° and vertically at 0° and so that the second segment LB12 and the third segment join at a junction point located at the origin of the coordinate system.

The recess 41*b* is profiled so that the third segment LB13 extends from the first segment LB11 downward, obliquely, to a point located horizontally at −3.5° and vertically at −1.9, then rises, obliquely, to the second segment LB12, in such a way as to form a substantially horizontal plateau, located vertically at −0.8°.

This light beam F1, which is called the kink, is intended to be complemented by the light beam F2, which is called the flat, and which will be described below, in order to form a low-beam illumination for right-hand traffic in the US, as shown in FIG. 5.

Various points have been shown in FIG. 4, these points defining, as required by the IIHS, maximum luminous-flux thresholds (identified by squares) and minimum luminous-flux thresholds (identified by triangles) that such low-beam illumination for right-hand traffic in the US must have.

Thus, a point 0.86 D-3.5 L defining a maximum luminous-flux threshold, in the present case 12 kCd, that the illumination must not exceed at this point has been indicated in the figure.

This point is here located at the center of zone W. However, since the zone W is not illuminated by the first light beam F1 but only by the second light beam F2 (as shown in FIG. 5), the constraint of respecting this threshold need thus be met only by this second light beam F2, this making it possible to facilitate design of the light-emitting modules in respect of the various light levels that they must generate.

A plurality of points G1 to G4 defining various maximum luminous-flux thresholds, and in particular thresholds ranging from 700 Cd to 2.7 kCd, have also been indicated in the figure. These points correspond to the positions of the glare-measuring photoelectric cells of the IIHS test protocol. They are thus located vertically above the horizontal axis H-H, in a vertical range extending from 0 to 0.8° and horizontally slightly to the left of the vertical axis V-V in a range extending from 0° to −2.2°. These points make it possible to evaluate the capacity of a light beam to generate discomfort glare or not, in particular in the event of variations in the attitude of the vehicle or for various adjustments of the vertical orientation of this light beam.

The profile of the recess 41*b* and the profile of the third segment LB13, and in particular the way in which this third segment LB13 rises to the second segment LB12, thus makes it possible to guarantee that the first light beam F1 will respect these maximum luminous-flux thresholds, including for variations in vertical orientation of 0.8°. Moreover, the presence of the horizontal plateau makes it possible to obtain a better tolerance in respect of adjustment of this vertical orientation.

Moreover, the reflective surface of the collector 41 comprises a zone 41*c* that is indented with respect to the rest of this surface, and that lies above the rear edge 41*a*. This zone 41*c* is thus defocused, so that the light emitted by the light-emitting diode 21 and reflected by this zone 41*c* is projected by the lens 51 above the upper cutoff LB1 of the first light beam F1, at points 1R, 2R and 3R located above the horizontal axis H-H, in particular at 0.5°, and to the right of the vertical axis V-V, in particular at 1°, 2° and 3°.

With regard to the light-emitting sub-modules 31, 33 and 35, each of the rear edges 42*a*, 44*a* and 46*a* of the collectors 42, 44 and 46 of these sub-modules has a profile such that the light beam formed by the image of the reflective surface of these collectors by the lens 52 has an upper cutoff that is substantially horizontal over its entire length, and that is aligned with the horizontal axis H-H.

In contrast, the rear edges 43*a* and 45*a* of the collectors 43 and 45 of the light-emitting sub-modules 32 and 34 each have a rearward recess 43*b* and 45*b*, which is extended into the reflective surface of these collectors by an indent 43*c* and 45*c*. The light beam formed by the image of the reflective surface of these collectors generated by the lens 52 thus has an upper cutoff comprising two substantially horizontal segments that are each aligned with the horizontal axis H-H and that are separated by a convex segment.

The second light beam F2, which results from combination of the light beams produced by the light-emitting sub-modules 31 to 35, thus has an upper cutoff LB2 that is substantially horizontal over its entire length, and that is aligned with the horizontal axis H-H. This light beam F2 also has a zone of lower light intensity Z, which is bounded by the upper cutoff LB2 and by a boundary B of convex shape, defined by the recesses 43*b* and 45*b*.

When the two light beams F1 and F2 are emitted simultaneously, as illustrated in FIG. 5, the upper cutoff LB2 is aligned with the first and second segments LB11 and LB12 of the upper cutoff LB1 (and with the axis H-H). Moreover, zone Z of the second light beam F2 covers zone W. Together these thus form, as explained above, a beam for low-beam illumination for right-hand traffic in the US that meets the regulatory requirements governing this function, and that allows the IIHS-test-protocol score of the headlamp incorporating the lighting device 1 to be improved, in particular when the vertical orientation of the lighting device 1 is varied.

Figure 6:
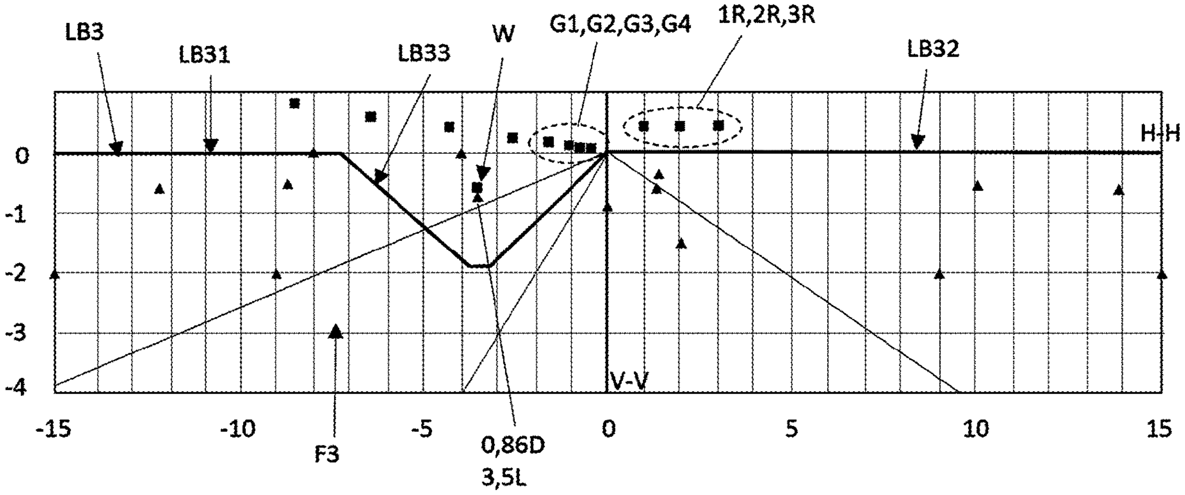
FIG. 6 schematically and partially a projection onto a screen of a first light beam emitted by a lighting device according to another embodiment of the invention.

FIG. 6 shows a projection, onto a screen, of a first light beam F3 emitted by a first light-emitting module according to another embodiment of the invention.

As shown in FIG. 6, the first light beam F3 formed by this first light-emitting module has an upper cutoff LB3, which comprises, similarly to the beam F1 of FIG. 4, a first segment LB31 that is substantially horizontal and aligned with the horizontal axis H-H, and a second segment LB32 that is substantially horizontal and also aligned with the horizontal axis H-H.

In contrast, the profile of the third segment LB33 separating the first segment LB31 from the second segment LB32 is distinct from the profile of the third segment LB13. This third segment LB33 extends from the first segment LB31 downward, obliquely, then rises, obliquely and substantially continuously, to the second segment LB32.

The above description clearly explains how the invention makes it possible to achieve the objectives that were set therefor, namely obtainment of a light-emitting module and of a lighting device incorporating such a light-emitting module that is of simple design and that allows the score of the lighting device as evaluated by an IIHS test protocol to be in-creased, by providing a light-emitting module able to generate a light beam having a cut-off a segment of which makes it possible to define, in the beam, a zone devoid of light and the position and dimensions of which allow the requirements of this test protocol to be met, including when the vertical orientation of the lighting device is varied.

In any event, the invention is not limited to the embodiments specifically described in this document, and extends in particular to all equivalent means and to any technically work-able combination of these means. It is for example possible to envision using types of optical device other than the one described, and in particular any optical device comprising one or a combination of a plurality of the following optical elements: reflector, lens, collimator, optical guide, shield. Other profiles and/or other dimensions and/or other locations could also be envisioned for the third segment of the upper cutoff of the first light beam. It is possible to envision combining this first light beam with a second light beam different from that described or even with more than one light beam.

What is claimed is:

1. A light-emitting module for a lighting device for a motor vehicle, comprising a light source and an optical device, the optical device being arranged to receive light emitted by the light source and to form, from this light, a light beam having an upper cutoff including a first segment and a second segment that are substantially horizontal and that are separated by a third segment that descends from the first segment and rises to the second segment, the third segment being such that the light beam has, when projected onto a screen, a zone devoid of light lying at least, horizontally, in a range extending substantially from 0° to −2.2° and, vertically, in a range extending substantially from 0° to −0.8°, when the light beam is projected onto the screen with a horizontal orientation of 0°, the optical device is arranged so that the third segment rises obliquely and substantially continuously from a point located horizontally between −3° and −4° and vertically between −1.7° and −2° to a point of junction with the second segment, the point of the junction with the second segment being located at 0°.

2. The light-emitting module as claimed in claim 1, wherein the optical device is arranged so that the third segment of the upper cutoff extends downward, from the first segment, obliquely.

3. The light-emitting module as claimed in claim 1, wherein the optical device is arranged so that the third segment rises obliquely and substantially continuously to the second segment.

4. The light-emitting module as claimed in claim 1, wherein the optical device is arranged so that the third segment rises obliquely to the second segment in such a way as to form a substantially horizontal plateau.

5. The light-emitting module as claimed in claim 4, wherein when the light beam is projected onto the screen with a horizontal orientation of 0°, the substantially horizontal plateau is positioned vertically at −0.8°.

6. The light-emitting module as claimed in claim 4, wherein when the light beam is projected onto the screen with a horizontal orientation of 0°, the substantially horizontal plateau lies horizontally in a range extending from −2.5° to 0°.

7. The light-emitting module as claimed in claim 1, wherein when the light beam is projected onto the screen with a horizontal orientation of 0°, the optical device is arranged so that the first segment extends to the left of the vertical axis of the coordinate system to a point of junction with the third segment, the point being located at least 7° to the left of the axis vertical, and the second segment extends to the right of the vertical axis of the coordinate system from a point of junction with the third segment, the point of the junction of the second segment with the third segment being located at 0°.

8. The light-emitting module as claimed in claim 1, wherein the optical device includes a collector including a reflective surface arranged to collect and reflect the light emitted by the light source and a lens arranged to project the light reflected by the collector, the light beam being formed by an image of the reflective surface of the collector formed by the lens.

9. The light-emitting module as claimed in claim 8, wherein the collector has a rear edge and wherein the lens has a focal zone located in the vicinity of the rear edge of the collector so that the upper cutoff of the light beam is formed by the image of the rear edge of this collector formed by the lens.

10. The light-emitting module as claimed in claim 9, wherein the reflective surface of the collector has a zone that is indented with respect to the rest of the reflective surface.

11. The light-emitting module as claimed in claim 9, wherein the rear edge has an elliptical profile provided with a recess that protrudes rearwardly from the rest of the rear edge, the third segment being formed by the recess.

12. A lighting device for a motor vehicle, comprising:

- a light-emitting module, the light-emitting module including a light source and an optical device, the optical device being arranged to receive light emitted by the light source and to form, from this light, a light beam having an upper cutoff including a first segment and a second segment that are substantially horizontal and that are separated by a third segment that descends from the first segment and rises to the second segment in such a way as to form a substantially horizontal plateau positioned vertically at −0.8°, the third segment being such that the light beam has, when projected onto a screen, a zone devoid of light lying at least, horizontally, in a range extending substantially from 0° to −2.2° and, vertically, in a range extending substantially from 0° to −0.8°, with the light-emitting module being a first light-emitting module and the light beam formed by the optical device of this first light-emitting module being a first light beam, and
- a second light-emitting module including a light source and an optical device, the optical device of this second light-emitting module being arranged to receive light emitted by the light source of this second light-emitting module and to form, from this light, a second light beam having an upper cutoff, the first light-emitting module and the second light-emitting module being arranged so that the upper cutoffs of the first and second light beams are substantially at least partially aligned.

13. The lighting device as claimed in claim 12, wherein the optical device of the second light-emitting module is arranged so that the second light beam has a zone of lower light intensity, of width larger than the width of the third segment of the upper cutoff of the first light beam and intended to be superposed on the zone devoid of light of the first light beam.

14. The lighting device as claimed claim 13, wherein the optical device of the second light-emitting module includes a collector including a reflective surface arranged to collect and reflect light emitted by the light source of the second light-emitting module and a lens arranged to project the light reflected by the collector of the second light-emitting module, the light beam being formed by an image of the reflective surface of the collector formed by the lens, wherein the collector has a rear edge provided with a recess and wherein the lens has a focal zone located in the vicinity of the rear edge of the collector so that the upper cutoff of the light beam is formed by the image of the rear edge of this collector formed by the lens.

15. The lighting device as claimed in claim 14, the first light-emitting module includes a collector including a reflective surface arranged to collect and reflect the light emitted by the light source and a lens arranged to project the light reflected by the collector, the light beam being formed by an image of the reflective surface of the collector formed by the lens, with the second-light emitting modules includes collectors and a lens arranged to project the light reflected by the collectors, wherein the collectors of the first and second light-emitting modules form a single part, and wherein the lenses of the first and second light-emitting modules form a single lens.

16. A light-emitting module for a lighting device for a motor vehicle, comprising a light source and an optical device, the optical device being arranged to receive light emitted by the light source and to form, from this light, a light beam having an upper cutoff including a first segment and a second segment that are substantially horizontal and that are separated by a third segment that descends from the first segment and rises to the second segment, the third segment being such that the light beam has, when projected onto a screen, a zone devoid of light lying at least, horizontally, in a range extending substantially from 0° to −2.2° and, vertically, in a range extending substantially from 0° to −0.8°, when the light beam is projected onto the screen with a horizontal orientation of 0°, the optical device is arranged so that the third segment extends, from a point of junction with the first segment, the point being located at least 7° to the left of the vertical axis, to a point located horizontally between −3° and −4° and vertically between −1.7° and −2°.

* * * * *